Figure 1:
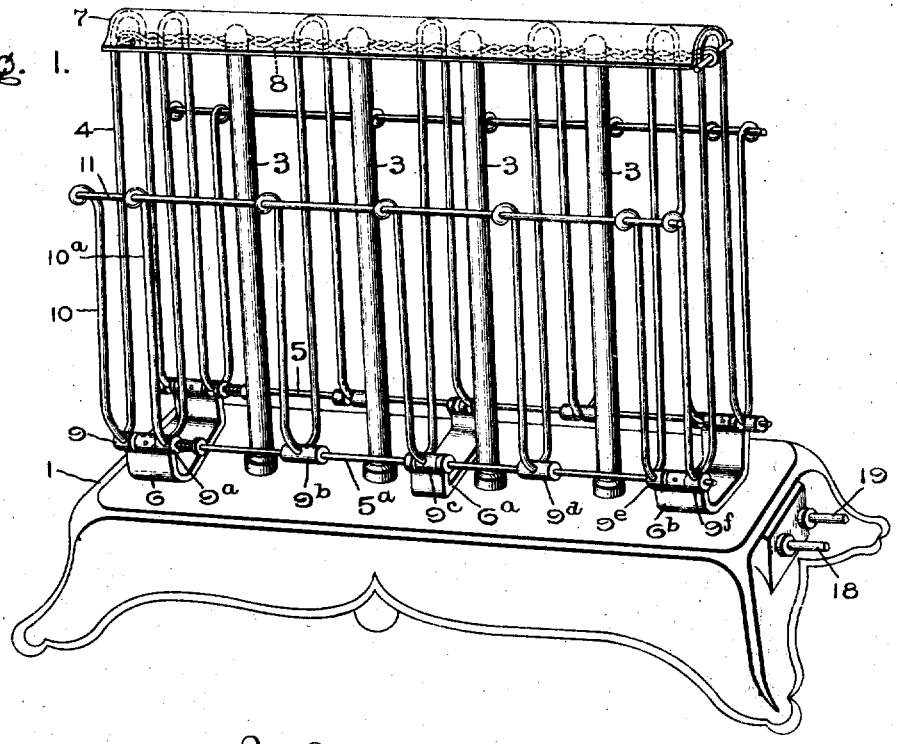

W. S. ANDREWS.

ELECTRIC TOASTER.

APPLICATION FILED NOV. 27, 1909.

Reissued Dec. 28, 1909. 13,060.

Witnesses:

Benjamin B. Hull

Ellen O. Foord

Inventor:

William S. Andrews, by Albert G. Davis

His Attorn

UNITED STATES PATENT OFFICE.

WILLIAM S. ANDREWS, OF SCHENECTADY, NEW YORK, ASSIGNOR TO GENERAL ELECTRIC COMPANY, A CORPORATION OF NEW YORK.

ELECTRIC TOASTER.

13,060. Specification of Reissued Letters Patent. Reissued Dec. 28, 1909.

Original No. 936,597, dated October 12, 1909, Serial No. 463,746. Application for reissue filed November 27, 1909. Serial No. 530,279.

*To all whom it may concern:*

Be it known that I, WILLIAM S. ANDREWS, a citizen of the United States, residing at Schenectady, county of Schenectady, State of New York, have invented certain new and useful Improvements in Electric Toasters, of which the following is a specification.

This invention relates to an electric cooking utensil of the kind in which it is necessary to apply radiant heat to secure the best results.

In certain cooking processes the product is most palatable and healthful when the operation is conducted entirely by means of radiant heat. This is especially the case in toasting or broiling, where it is the custom to place the material (bread or meat) before an incandescent fire, the high heat quickly drying the surface and browning the toast, or searing the outside of the steak, and thereby retaining within the same the juices of the meat.

The invention in the present application is especially designed with reference to the application of toasting bread; but might also be applied to broiling steak without material change in the design.

In carrying out my invention I provide a source of radiant heat, for which purpose I may employ a heating unit of the same general character as described in my prior application, No. 438,101, filed January 12th, 1908. This heating unit comprises two tubes of fused silica, one within the other, the inner one being wound with a high resistance wire of refractory metal and acting as a support for the wire, and the outer one being mounted on a threaded base and afterward secured in a socket in the base of the apparatus, the socket being provided with leads connected in parallel with the high resistance wires forming the heating elements and leading to terminals. A plurality of tubes of this character are mounted upright in the supporting base and inclosed within an open wire cage to prevent contact of the clothing of the operator with the heating tubes. On the sides of this cage are pivoted open work wire frames adapted to be folded to and from the tube inclosing cage, and constituting baskets in which bread, or any other material to be operated upon, may be subjected for the cooking operation.

One of the features of my structure involves the open work cage for supporting the material to be operated upon in proper relation to the inclosed source of radiant heat. In my prior application, above referred to, I applied this material in a superposed horizontal position with relation to the source of radiant heat, in the present invention I apply it in a vertical relation thereto, and this arrangement has several advantages, the most important of which is, especially for toasting and broiling, that upward currents of air are created, which carry off the gases and conduce to a better product. In addition to this, the circulation of air keeps the inclosing cage at a lower temperature and renders the apparatus more convenient to manipulate. By means of this structure I may apply to the open work basket (formed by the central fixed frame and the folding frames) two pieces of bread, the sides of which adjacent to the source of heat may be toasted at the same time, and which may be readily removed when the toasting operation reaches the proper stage and reversed in position for treatment of the other side of the bread.

Figure 2:
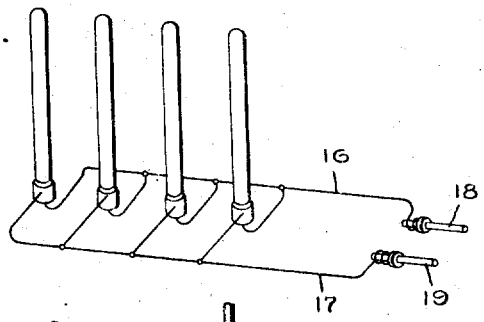
Figure 3:
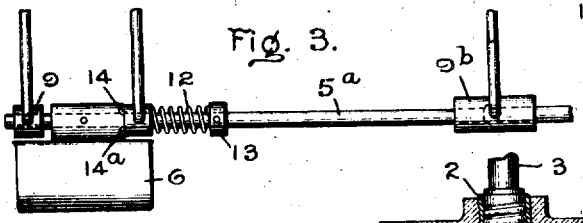
Figure 4:
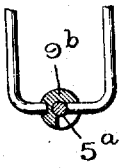
Figure 5:
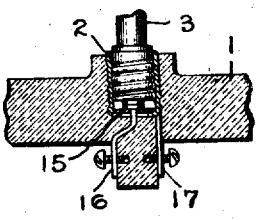

In the accompanying drawings which illustrate my invention, Figure 1 is a perspective view of a toaster embodying my improvements; Fig. 2 is a diagrammatic view, showing the service connections with the heating tubes; Fig. 3 is a detail view, showing the method of mounting the folding wire frames; Fig. 4 is a sectional view, showing the relation of the fixed and movable parts of the folding frame, and Fig. 5 is a detail, showing the method of mounting the heating units.

Referring more particularly to the drawings, 1 represents a base made of any suitable fireproof insulating material, such as porcelain, slate, or fireproof molded material, in which are provided along a central line a number of openings, in which are mounted metallic sockets 2 to receive a plurality of heating tubes 3. Around these tubes is an open wire work frame, consisting of a number of inverted U-shaped wires 4, the lower ends of which are firmly secured to two horizontal wires 5 and $5^a$ mounted in metal yokes 6, $6^a$, $6^b$, secured to the base. This frame is somewhat higher than the heating elements, and is capped at the top by a sheet metal hood 7. The upper ends of the heating elements are anchored in position by two twisted wires 8, the ends of which are fastened to two short rods mounted on the ends of the inclosing frame. The twisted wires are opened at points intermediate of their length to permit inclosure of the tops of the heating elements, as clearly indicated in Fig. 1. On the wires 5, 5[a] adjacent to the base are pivoted sleeves 9, 9[a], 9[b], 9[c], 9[d], 9[e], 9[f], a corresponding set being provided on each wire, in which are rigidly mounted the wires 10, 10[a], etc., of a folding frame, the upper ends of these wires being held together by a wire 11. At two or more points the fixed wires 5, 5[a] are secured to the yokes 6, 6[a], 6[b].

The pivoted folding frame has a slight lateral movement and is held under spring tension by spring 12 acting against a fixed collar 13 on the rods 5, 5[a]. One or more projections are formed on one or more of the sleeves 9 adapted to enter in the open and closed positions of the folding frames in notches 14, 14[a] in the upper part of the yoke 6, all of which will be clearly understood from an inspection of Fig. 3. The sleeves 9, 9[a], etc., are slotted on the inner side to permit of movement around the joint of the wires 5, 5[a], as clearly indicated in Figs. 3 and 4. In the base of the fixed socket 2 is a mica washer 15, on top of which is a contact connecting through a wire with a lead 16 on the underside of the base. A similar wire connects the socket 2 with a corresponding lead 17. Similar connections are arranged for each socket, and thus the several heating elements are connected in parallel, as shown in Fig. 2, with the leads 16, 17, which communicate with the two plug terminals 18, 19 at one end of the base. Thus it will be seen that the several fused silica tubes inclosing the resistance wire are surrounded by a vertical open-work frame, which protects the clothing of the operator from contact with the incandescent heating units when the toaster is in operation and which permits the radiant heat to be directed upon the material in the baskets. The folding frames or baskets may be opened to receive the bread, and then closed thereby automatically latching in closed position. The two terminals 18, 19 will be connected in service by a connecting plug and flexible cord with a source of constant potential current. The springs 12 should be made of some material which will retain its elasticity when heated. The resistance wire I may employ is an alloy such as described in the patent to Dempster, No. 901,428, dated October 20, 1908.

When making toast the frames may be opened to introduce or remove the toast, or reverse its position, or to initially dry it for the best condition for the toasting heat. They are then closed and the toasting heat applied. The fumes or smoke given off by the toast are carried away from the bread by the upwardly ascending currents of air, and a delicious product thereby rendered possible. In addition to this, the air currents keep the wire frame at a relatively low temperature enabling the apparatus to be more conveniently handled. With the resistance wire at a bright red heat and the entire surface of the inclosing silica tubes raised to a red heat, the close relation of the bread to the heat tubes when the baskets are folded permits a very effective operation.

While I have described my invention as applied to toasting, it will be evident to those skilled in the art that it is well adapted also to any operation in which radiant heat is essential to a good culinary product, such as broiling, and I, therefore, desire to have it understood that all such operations are within the scope of my claims.

What I claim as new and desire to secure by Letters Patent of the United States, is,—

1. An electric cooking utensil, comprising a plurality of electric heaters adapted to be operated at a radiant heat and surrounded by an open-work casing having a plurality of supports for material to be heated, whereby the radiant heat from the several units may be applied simultaneously on two sides in view of the operator.

2. An electric cooking utensil, comprising a plurality of heating units inclosed in an open-work casing, said heating units being adapted to run at a radiant heat, and a plurality of baskets on opposite sides of the units to receive the material to be heated.

3. An electric heating utensil, comprising a plurality of electrically heated units adapted to be operated at a radiant heat arranged in a line, an open-work wire frame inclosing the heating units, and a plurality of baskets on two sides of the units to receive the material to be heated.

4. An electric cooking utensil, comprising a plurality of heating elements adapted to be operated at radiant heat arranged in a line, an open wire-work frame inclosing the heating units, and two pivoted frames at the sides of the heating units adapted to form baskets to receive the material to be heated.

5. An electric cooking utensil, comprising a plurality of vertically arranged heating units, an open-work wire cage inclosing the same, and two folding baskets to receive the material to be heated at the sides of the units.

6. An electric cooking utensil, comprising a plurality of vertical, removable, cylindrical heating elements arranged in line and connected in parallel in relation to a supply circuit, an open-work cage or frame inclosing the same, and two folding baskets at the sides to receive the material to be heated.

7. An electric cooking utensil, comprising a plurality of electric heaters, a folding open-work cage inclosing the same, and a latch to lock the cage in closed position.

8. An electric cooking utensil, comprising an electric heater adapted to be operated at a radiant heat, and means for supporting the material to be heated in a substantially vertical position within view of the operator.

9. An electric cooking utensil, comprising an electric heater adapted to be operated at a radiant heat and surrounded by an open-work casing having supporting means for the material to be heated, whereby the radiant heat from the unit may be applied simultaneously on both sides.

In witness whereof I have hereunto set my hand this 26th day of November, 1909.

WILLIAM S. ANDREWS.

Witnesses:
BENJAMIN B. HULL.
HELEN ORFORD.